United States Patent [19]
Hall

[11] 3,874,702
[45] Apr. 1, 1975

[54] HITCH FOR TRAILERS OVERHANGING A TRUCK BED OR CAR BODY

[76] Inventor: Percy P. Hall, 4103 W. Main St., Apt. 21, Kalamazoo, Mich. 49007

[22] Filed: Nov. 13, 1972

[21] Appl. No.: 306,042

[52] U.S. Cl. .......................................... 280/423 R
[51] Int. Cl. ............................................. B62d 53/06
[58] Field of Search ............................. 280/423, 438

[56] References Cited
UNITED STATES PATENTS

| | | | |
|---|---|---|---|
| 2,425,521 | 8/1947 | Ellberg | 280/423 R |
| 3,164,399 | 1/1965 | Lugash | 280/423 R |
| 3,390,896 | 7/1968 | Philapy | 280/423 R |
| 3,392,992 | 7/1968 | Baker et al. | 280/423 R |

Primary Examiner—Leo Friaglia
Assistant Examiner—R. Schrecengost
Attorney, Agent, or Firm—Austin A. Webb

[57] ABSTRACT

A hitch for a trailer having a raised front end overhanging the bed of a pick-up truck has a box section post depending from the front of the trailer. A top bearing plate secured to the bottom of the post is swivelly connected to a bottom bearing plate by a central pin. The bottom bearing plate is connected to a cross bar having pintle pins projecting from its ends and removably receivable in horizontal bearings supported over the rear wheel housing of the trailer.

10 Claims, 5 Drawing Figures

HITCH FOR TRAILERS OVERHANGING A TRUCK BED OR CAR BODY

OUTLINE OF INVENTION

Similar trailer hitches have provided short coupling pins on the front ends of the trailer which are releasably engageable in small versions of the "fifth wheel" coupling used on heavy duty highway freight trailers and truck tractors. These not only had releasable locks to the fifth wheel, but further required removal of the heavy "fifth wheel" before the bed of the pick-up truck could be used to full capacity, or in a normal manner.

The present invention provides a bearing on a vertical axis which is permanently connected to the trailer. The bearing and the cross bar to which it is connected is released and removed with the trailer from the pick-up truck or car, thus leaving the vehicle free for normal use without the trailer. Cammed guides for easier alignment and engagement of the cross bar with the mounting connections on the vehicle are provided.

DESCRIPTION

The drawings, of which there are two sheets, show a practical and preferred form of the hitch as applied to a pick-up truck.

Figure 1:
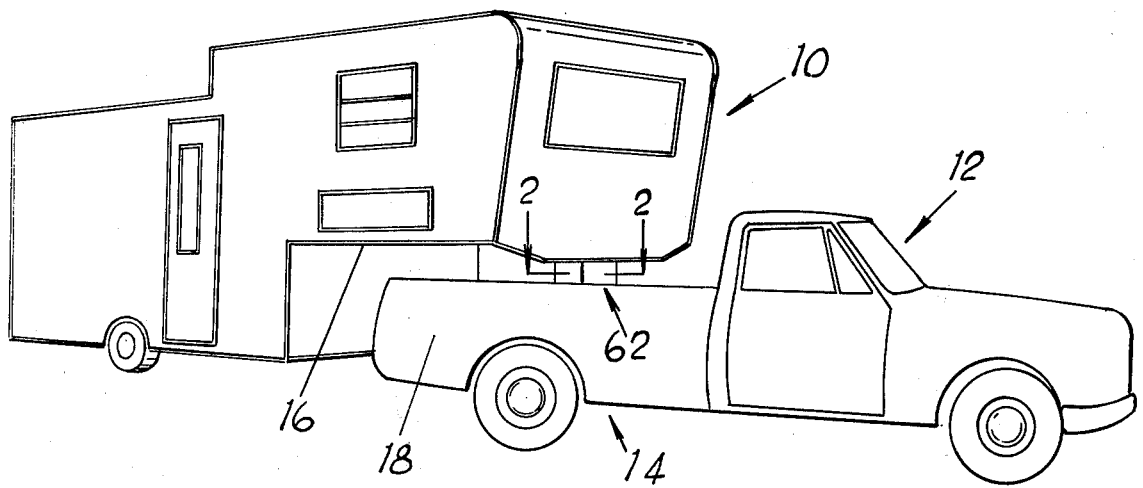
FIG. 1 is an elevational view of a trailer and a pick-up truck connected by a hitch embodying the invention.

As is shown in FIG. 1, the hitch of the invention is used to connect a trailer 10 to a towing vehicle 12 of the pick-up truck variety having an open rear bed or box 14. The forward end of the trailer is stepped upwardly on the lower side of its forward end as at 16, so as to clear the side walls 18 of the box when connected to the truck.

Figure 2:
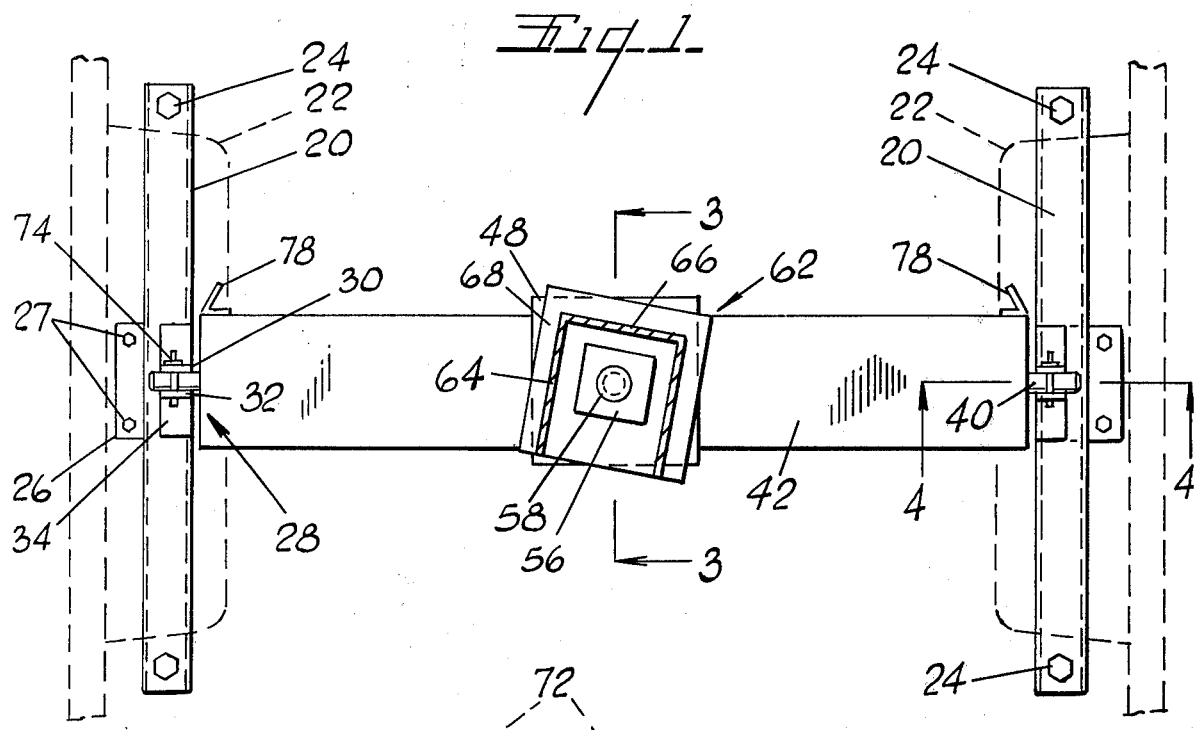
FIG. 2 is a horizontal cross sectional view taken along the plane of the line 2—2 in FIG. 1.
Figure 4:
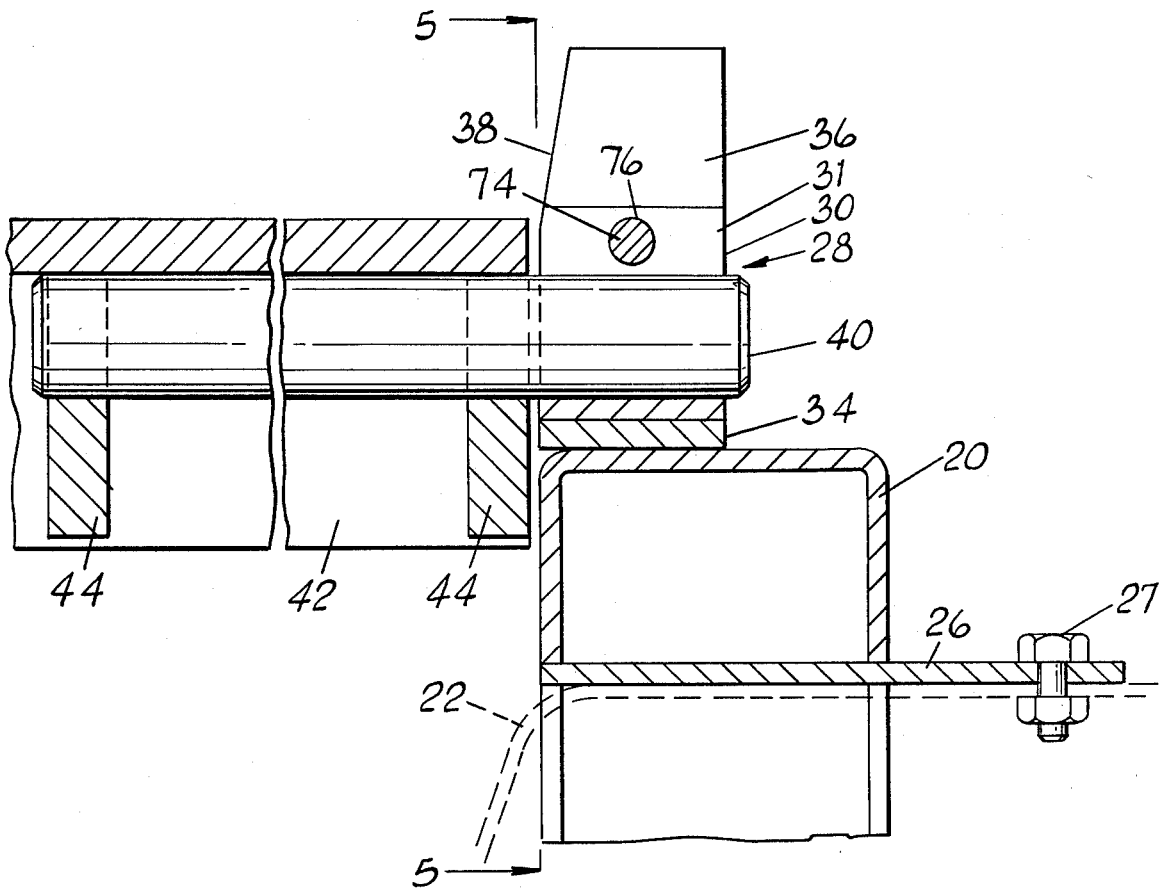
FIG. 4 is an enlarged fragmentary vertical cross sectional view taken along the plane of the line 4—4 in FIG. 2.
Figure 5:
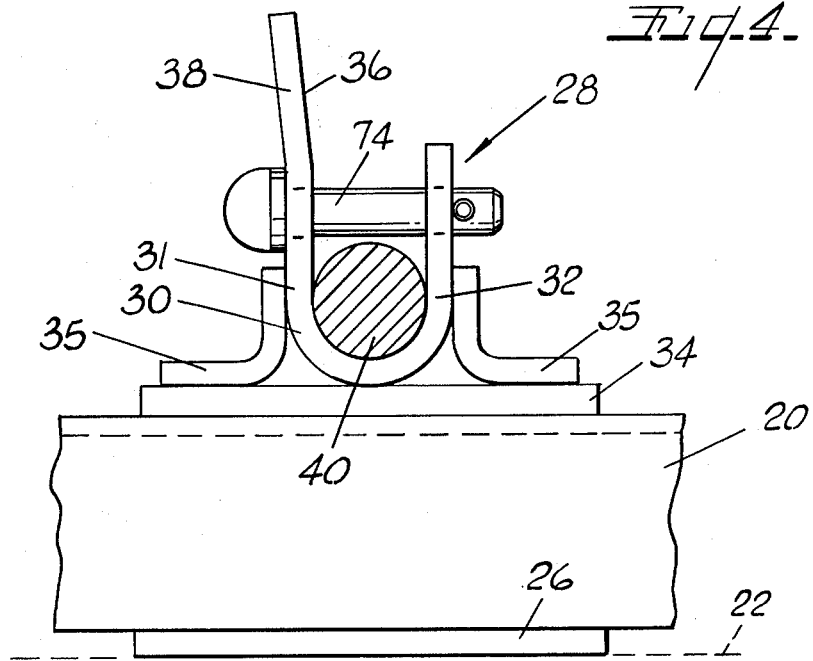
FIG. 5 is a vertical cross sectional view taken along the plane of the line 5—5 in FIG. 4.

As appears more clearly from FIGS. 2, 4 and 5, the bed of the truck is provided with two mounting yokes 20 which extend in bridging relation over the rear wheel housings of the truck, indicated by the dotted lines at 22. The ends of the yokes are secured as by bolts 24 to structural parts of the truck body or frame. As will appear more clearly, these connections may be more or less permanent without materially interferring with the normal use of the truck and its bed when not pulling the trailer. The particular yokes shown are of downwardly opening channel shaped cross section, but this of course could be changed as desired. A bearing plate 26 is secured across the bottom of the channel to bear against the rear wheel house panel and transmit part of the load on the yoke to the wheel house. The plates 26 are bolted to the wheel housing at 27 to further strengthen and locate the yokes.

Secured to the tops of the yokes 20 are a pair of saddle assemblies generally indicated at 28 which form transversely extending pin receiving slots. In the example illustrated, the saddles consist of J-shaped parts 30 having long front legs 31 and shorter rear legs 32 secured to reinforcing bearing plates 34 by suitable attaching angles 35. The plates 34 are in turn secured to the tops of the yokes. The upward legs 31 of the parts 30 extend vertically higher than the legs 32 to act as locating stops, and are further bent or cammed slightly forwardly as at 36. The inner side edges of these legs are further desirably cammed or inclined downwardly and inwardly as appears at 38 in FIG. 4.

The saddle assemblies 28 rockably receive the ends of rocker pins 40 which project from the ends of a transverse support bar 42. The bar is of downwardly opening channel section and has reinforcing filler plates 44 welded between its flanges to receive and hold the ends of the pins. The center of the support bar is reinforced by a flat filler plate 46 and has a rectangular bearing plate 48 secured to its upper side and projecting beyond the front and rear edges of the bar. Gusset plates 50 may be used to brace the projecting parts of the bearing plate. The bearing plate, the web of the cross bar and the filler plate are all bored vertically to receive a suitable bushing or upright bearing 52.

The bearing plate 48 acts as a support for an upper bearing plate 54 which is also rectangular and generally coextensive with lower plate 48. The shapes of the plates may be varied but desirably are considerably wider than the cross bar. The upper bearing plate is reinforced in the center by a plate 56, and both plates are bored to receive the headed pivot pin 58. The pin is permanently held in place by means such as the nut 60 or other locking device to swivelly hold the plates together.

Figure 3:
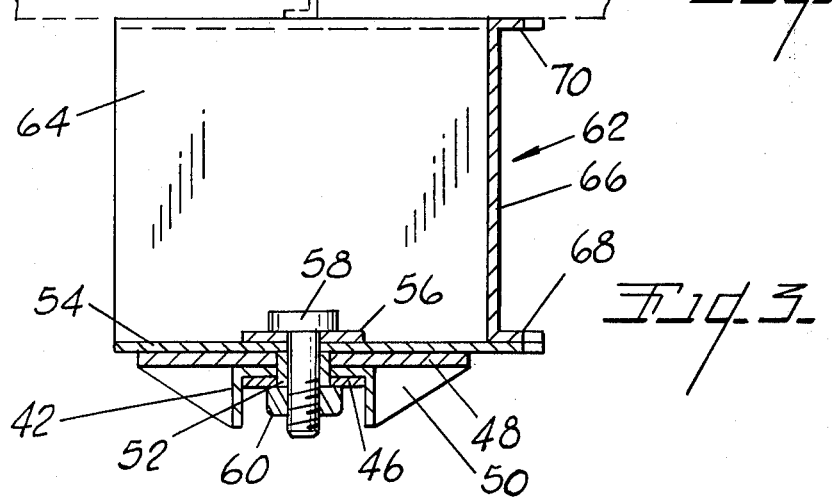
FIG. 3 is a longitudinal vertical cross sectional view taken along the plane of the line 3—3 in FIG. 2.

Secured to the top of the upper bearing plate 54 is a towing and supporting strut generally indicated at 62. The strut is a hollow element with side walls 64 and connecting front wall 66, and has outturned lower flanges 68 which are welded to the edges of the upper bearing plate 54. The upper edges of the side and front walls have outturned flanges 70 which are permanently secured as by welding to suitable structural parts on the bottom of the raised front portion of the trailer, such as the structural or frame members indicated by the dotted lines at 72 in FIG. 3.

When not connected to the truck, the front end of the trailer is supported by jacks or adjustable legs (not illustrated) which are common to this type of trailer. The cross or transverse support bar 42 remains connected to the trailer, and may be swung to any convenient angle. The truck is then backed under the support bar until the pins 40 strike the raised ears 36. Note that exact alignment of truck and trailer is not necessary as engagement with one ear will swing the bar to engage both ears. The front end of the trailer may then be lowered with the coacting cammed surfaces formed by the bevel 36 and pins 40 guiding the pins into the saddles. A transverse aligning and centering action may also be utilized by the camming action of the laterally beveled edges 38 on the ends of the cross bar and the outer filler plates 44 in its ends. After the pins are seated in the saddles retaining pins 74 may be secured through holes 76 in the ears, although the weight of the front end of the trailer will normally hold the pins of the hitch in position under all operating conditions.

To further facilitate coupling the vehicles or backing the truck into the correct position under the support bar, angled cam brackets 78 are secured to the front of the bar near its ends where they will strike the upstanding ears 30 to cam the parts laterally into proper vertical alignment.

The broad area of bearing plates 48 and 54 carries the vertical load of the trailer as well as most of any transverse tilting loads, so the pin 58 carries mainly longitudinal loads between the vehicles. A suitable lubricant is usually applied between plates 48 and 54.

As far as longitudinal points of connection of the yoke elements to the vehicles is concerned, the J-hooks 30 are desirably located slightly forwardly of rear axle of the truck, so the tongue load of the trailer is carried primarily by the rear springs of the truck.

What is claimed as new is:

1. A trailer having the lower portion of its front end raised above the level of its rear portion to overlie the rear end of a towing vehicle and side walls on said vehicle,
    a central post secured in depending relation to the underside of said raised front end of said trailer,
    a transverse support bar permanently and swivelly connected at its mid-section to the bottom of said post,
    a means forming horizontal pivots on the ends of said support bar and in longitudinally extending relation thereto,
    said pivot means being adapted to be removably received by coacting bearing support means secured in transversely spaced relation to the rear of said vehicle.

2. A trailer as defined in claim 1 in which said central post is a hollow structure having spaced side walls connected by at least one cross wall,
    said support bar being connected to the bottom of said post by bearing means disposed around a vertical axis extending centrally of said post.

3. A trailer as defined in claim 2 in which said means forming said horizontal pivots on said support bar are pivot pins fixedly secured to said bar and projecting therebeyond.

4. A trailer hitch for vehicles having transverse rear beds with wheel housings projecting into the sides thereof and above the bed, and trailers having elevated front ends adapted to overly the rear of the vehicle, said hitch comprising
    A. a supporting and towing strut adapted to be secured in depending relation to the front end of said trailer,
        1. said strut being of hollow construction with a front wall and side walls at least a foot apart,
    B. a flat bottom plate on said strut connected to the lower edges of said walls,
    C. a towing pin connected to said bottom plate and projecting therebelow,
    D. a transverse support bar having a support plate secured to its center and in opposed lapped relation to said bottom plate,
    E. means forming a vertical bearing through said support bar and said support plate and rotatably receiving said towing pin,
    F. means on the lower end of said towing pin permanently securing said plates vertically together,
    G. horizontal rocker pins secured to the ends of said support bar and projecting from the ends thereof,
    H. and saddle means attachable to the bed of said vehicle in laterally spaced relation vertically above the bed and above said wheel housings, said saddle means being adapted to removably receive said rocker pins in vertically and longitudinally supported relation relative to said vehicle,
        1. said saddle means including supporting yokes attachable to the bed of the vehicle in longitudinally bridging relation to said wheel houses and in supported relation on the tops of said wheel houses.

5. A trailer hitch as defined in claim 4 in which said saddle means and the ends of said support bar have coacting vertically and transversely cammed surfaces acting to center said support bar between said saddle means upon vertical engaging motion therebetween.

6. A trailer hitch as defined in claim 4 in which said walls of said strut are rectangular plates connected at their adjacent edges and having outturned flanges at their upper edges attachable to said trailer,
    and outturned flanges on the lower edges of said walls attached to said bottom plate,
    said bottom plate on said strut and said support plate on said support bar being generally coextensive.

7. A trailer hitch as defined in claim 6 in which said transverse support bar is a downwardly opening channel with said support plate welded to the top thereof and projecting to the front and rear thereof.

8. A trailer hitch as defined in claim 7 in which the ends of said channel shaped support bar have filler plates secured between the flanges of the channel,
    said rocker pins extending through said filler plates.

9. A trailer hitch for vehicles having transverse rear beds with wheel housings projecting into the sides thereof and above the bed, and trailers having elevated front ends adapted to overlie the rear of the vehicle, said hitch comprising
    A. a supporting and towing strut adapted to be secured in depending relation to the front end of said trailer,
        1. said strut being of hollow construction with a front wall and side walls at least a foot apart,
    B. a flat bottom plate on said strut connected to the lower edges of said walls,
    C. a towing pin rigidly connected to said bottom plate and projecting therebelow,
    D. a transverse support bar having a support plate secured to its center and in opposed lapped relation to said bottom plate,
    E. means forming a vertical bearing through said support bar and said support plate and rotatably receiving said towing pin,
    F. means on the lower end of said towing pin permanently securing said plates vertically together,
    G. horizontal rocker pins secured to the ends of said support bar and projecting in alined relation from the ends thereof,
    H. saddle support yokes attachable to the bed of said vehicle in longitudinally bridging relation to said wheel houses and in supported relation on the tops of the wheel houses,
    I. and saddle means on the tops of said support yokes adapted to removably receive said rocker pins in vertically and longitudinally supported relation relative to said vehicle,
        1. said saddle means having forward arms projecting higher than rear arms to act as stops in locating said rocker pins over the saddle means.

10. A trailer hitch as defined in claim 9 in which said saddle means and the ends of said support bar have coacting vertically and transversely cammed surfaces acting to center said support bar between said saddle means upon vertical engaging motion therebetween.

* * * * *